UNITED STATES PATENT OFFICE.

JULIUS KANTOROWICZ, OF BRESLAU, GERMANY.

PROCESS OF MAKING SOLUBLE STARCH.

1,207,177.  Specification of Letters Patent.  Patented Dec. 5, 1916.

No Drawing.  Application filed October 19, 1914. Serial No. 867,511.

*To all whom it may concern:*

Be it known that I, JULIUS KANTOROWICZ, manufacturer, a subject of the King of Prussia and the German Emperor, residing at 28 Goethe street, Breslau, Kingdom of Prussia, German Empire, have invented a new and useful Improvement in Processes for Making Soluble Starch; and I do hereby declare the following to be a full, clear, and exact description of the same.

The present invention refers to a new process for making soluble starch soluble in boiling water and preserving the state of solution on cooling, and on standing at ordinary temperature.

It is known that by the action of mineral acids alone or by the action of persalts alone on starch, starch is produced which is soluble in a small amount of boiling water but has the disadvantage that these solutions solidify or gelatinize on cooling. This behavior of the known solutions of soluble starch causes many disadvantages in the technical use of such solutions. Such solutions may only be used warm for sizing or gluing operations and in case that a cooling of the solutions had taken place, a rewarming must be effected. It is known to prepare soluble starch, the solutions of which do not solidify or gelatinize on cooling by treating starch with large amounts of glacial acetic acid at temperatures of at least 100 degrees centigrade and distilling off the acetic acid. This process, however, has many difficulties, because the process can only be carried out in glass vessels which are of course very breakable. Metal vessels cannot be used, because metals are attacked by the required glacial acetic acid, especially at the necessary high temperatures.

I have now found that one may prepare soluble starch, the solutions of which do not solidify or gelatinize on cooling, by causing organic acids, especially volatilizable organic acids, in the presence of substances apt to convert ordinary starch into soluble, as small amounts of mineral acids or persalts, to act on starch. One can use small amounts of organic acid even in diluted state and can use vessels of wood. The reaction may be accelerated by warming. In this case my process shows the advantage that the heating can be shortened and may be carried out at lower temperatures than the known process. In this way the used vessels are not attacked.

My process allows the use of vessels of wood, which cannot be used in the process using glacial acetic acid at temperatures above 100 degrees centigrade. For my process temperatures between 30 and 50 degrees centigrade are sufficient.

Organic acids suitable for my process are for instance: formic acid, acetic acid, lactic acid, butyric acid. Suitable persalts are for instance: the permanganates of potassium, sodium, calcium, the persulfates of potassium, sodium, ammonium, the perborates of potassium, sodium, ammonium, also the persalts of the heavy metals.

In my process I may use organic acids together with mineral acids or with persalts or with mineral acids and persalts. It is, however, necessary for my process that one uses besides the organic acids at the same time mineral acids or persalts or mineral acids and persalts.

*Examples.*

(1) 100 kilograms of starch, for instance potato starch, are mixed with 200 grams of potassium persulfate, and with 7 kilograms of acetic acid of 50 percentage or of an equivalent amount of more diluted acetic acid. One allows the mixture to stand at ordinary temperature for 12–24 hours. By warming for instance to 30 degrees centigrade one may shorten the duration of the process. The persulfate may be preferably employed in dry state or in a highly concentrated solution. It is recommendable to agitate the mixture while standing.

(2) 100 kilograms of starch, 7 kilograms of acetic acid of 50 percentage and 1 kilogram of hydrochloric acid of 1.171 specific gravity are mixed with each other and treated as indicated in Example 1.

(3) 100 kilograms of starch, 7 kilograms of acetic acid of 50 percentage, 100 grams of potassium persulfate, 1 kilogram of hydrochloric acid of 1.171 specific gravity are mixed with each other and treated as indicated in Example 1.

After the action having been completed one may neutralize the acid with basic compounds and eliminate the acid by washing with water. A distillation of the acids as necessary in the known process is therefore avoided.

In the above examples one may use the same amount of perborate or of another persalt instead of the persulfate.

The soluble starch produced according to the present process gives solutions which even in a very high concentration for instance 1 part by weight of starch in 4-6 parts of water do not solidify or gelatinize in cooling.

The obtained soluble starch may be mixed with water in the form of a paste and be led in a thin layer over heated drums, as described in my Letters Patent 1105567. By this modification one obtains a starch swelling up in cold water. This starch has the advantage of giving with small amounts of water a solution of high cementing power.

I claim:—

1. The process for making soluble starch, the solutions of which do not solidify or gelatinize at ordinary temperature which consists in causing to act on starch dilute organic acids together with substances converting starch into soluble starch.

2. The process for making soluble starch, the solutions of which do not solidify or gelatinize at ordinary temperature which consists in causing to act organic acids together with persalts on starch.

3. The process for making soluble starch, the solutions of which do not solidify or gelatinize at ordinary temperature which consists in causing to act organic acids together with persalts and mineral acids on starch.

In testimony whereof I have signed my name to this specification in the presence of two subscribing witnesses.

JULIUS KANTOROWICZ.

Witnesses:
ERNST KATZ,
HANS LIEPHE.